(12) United States Patent
Feng

(10) Patent No.: US 9,525,541 B2
(45) Date of Patent: Dec. 20, 2016

(54) METHOD AND SYSTEM FOR IMPLEMENTING TIME SYNCHRONIZATION

(71) Applicant: Huawei Technologies Co., Ltd., Shenzhen (CN)

(72) Inventor: Liexun Feng, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 68 days.

(21) Appl. No.: 13/952,200

(22) Filed: Jul. 26, 2013

(65) Prior Publication Data

US 2013/0308958 A1 Nov. 21, 2013

Related U.S. Application Data

(63) Continuation of application No. PCT/CN2011/070663, filed on Jan. 26, 2011.

(51) Int. Cl.
*H04L 7/00* (2006.01)
*H04J 3/06* (2006.01)
*H04Q 11/00* (2006.01)

(52) U.S. Cl.
CPC .......... *H04L 7/0075* (2013.01); *H04J 3/0644* (2013.01); *H04Q 11/0067* (2013.01); *H04J 3/0667* (2013.01); *H04Q 2011/0079* (2013.01); *H04Q 2213/1301* (2013.01); *H04Q 2213/1336* (2013.01)

(58) Field of Classification Search
CPC ............... H04J 3/0644; H04Q 11/0067; H04Q 2213/1301; H04Q 2213/1336; H04L 7/0075

USPC ......................................................... 398/141
See application file for complete search history.

(56) References Cited

U.S. PATENT DOCUMENTS 8,718,482 B1 * 5/2014 Roberts .................. H04B 10/27
398/102
2008/0175275 A1 7/2008 Garner et al.
(Continued)

FOREIGN PATENT DOCUMENTS

CN 101552663 A 10/2009
CN 101795423 A 8/2010
(Continued)

OTHER PUBLICATIONS

International Search Report received in International Application No. PCT/CN2011/070663, mailed Jul. 7, 2011, 8 pages.
(Continued)

*Primary Examiner* — David Payne
*Assistant Examiner* — Omar S Ismail
(74) *Attorney, Agent, or Firm* — Slater Matsil, LLP

(57) ABSTRACT

The present disclosure discloses a method and a communication system for time synchronization. The system includes at least one base station, an optical line terminal OLT, and a fiber for transmitting information between the base station and the OLT. The system further includes a clock synchronization server, configured to transmit synchronization data between the clock synchronization server and the at least one base station, so that time synchronization is implemented between the at least one base station and the clock synchronization server. According to the solutions provided by the present disclosure, the system apparatus is simple, and the cost low.

12 Claims, 2 Drawing Sheets

(56) References Cited

U.S. PATENT DOCUMENTS

| | | | |
|---|---|---|---|
| 2009/0067850 A1* | 3/2009 | Mizutani | H04J 3/0605 398/154 |
| 2009/0103918 A1 | 4/2009 | Tsuge et al. | |
| 2010/0040369 A1* | 2/2010 | Zhao | H04J 3/0664 398/58 |
| 2010/0061729 A1* | 3/2010 | Weeber | H04J 3/1694 398/71 |
| 2010/0080249 A1* | 4/2010 | Li | H04J 3/0688 370/503 |
| 2010/0098433 A1* | 4/2010 | Boyd | H04J 3/0658 398/155 |
| 2011/0052206 A1* | 3/2011 | Zheng | H04J 3/0697 398/154 |
| 2011/0262133 A1 | 10/2011 | Yuan | |
| 2011/0286560 A1* | 11/2011 | Pignatelli | H04J 3/0655 375/356 |
| 2012/0027405 A1* | 2/2012 | Zheng | H04J 3/0697 398/25 |
| 2012/0027414 A1* | 2/2012 | Wei | H04J 3/0655 398/100 |
| 2012/0052857 A1* | 3/2012 | Kumar | H04W 24/08 455/424 |
| 2012/0301147 A1* | 11/2012 | Zhao | H04J 3/0664 398/66 |

FOREIGN PATENT DOCUMENTS

| | | |
|---|---|---|
| CN | 101945468 | 1/2011 |
| CN | 101945468 A | 1/2011 |
| JP | 2008178086 A | 7/2008 |
| JP | 2009118469 A | 5/2009 |
| JP | 2009159114 A | 7/2009 |
| JP | 2010206327 A | 9/2010 |
| WO | 2008093600 A1 | 8/2008 |
| WO | 2009118878 A1 | 10/2009 |

OTHER PUBLICATIONS

Written Opinion of the International Searching Authority received in International Application No. PCT/CN2011/070663, mailed Jul. 7, 2011, 10 pages.

IEEE 1588, Version 2, Consultant Geoffrey M. Garner, ISPCS, Ann Arbor'08, Sep. 24, 2008, 89 pages.

International Search Report and Written Opinion received in Application No. PCT/CN2011/070663, mailed Jul. 7, 2011, 12 pages.

* cited by examiner

METHOD AND SYSTEM FOR IMPLEMENTING TIME SYNCHRONIZATION

CROSS-REFERENCE TO RELATED APPLICATIONS

This application is a continuation of International Application No. PCT/CN2011/070663, filed on Jan. 26, 2011, which is hereby incorporated by reference in its entirety.

FIELD OF THE DISCLOSURE

The present disclosure relates to the field of communications, and in particular, to a method and a system for implementing time synchronization in a communication system.

BACKGROUND OF THE DISCLOSURE

In a mobile communication system, a base station is an important component part of a mobile communication network, and is used to receive and transmit a wireless signal, so that a user equipment (UE) gets access to a wireless network.

A region such as a home environment, a workplace or a shopping mall always easily becomes a region that is covered with a relatively poor mobile signal. The problem of poor mobile signal coverage may be solved by introducing a small-sized base station such as a Micro (MICRO) base station, a Pico cell (PICO) base station, and a Femto cell (Femto) base station. For example, a Femto base station is set at home to implement indoor coverage with a family as a unit, and various types of digital subscriber lines (XDSL), fiber to the home (Fiber To The Home, FTTH) or any one of other digital subscriber access modes is used to get access to an Internet Service Provider (ISP). For an application environment such as an office building or a shopping mall, a base station regional network may be planed and designed according to requirements. For example, a MICRO base station, a PICO base station, or a Femto base station may be used to perform indoor or regional hotspot coverage; and an FTTB optical network may be used to get access to a core network, so as to provide wireless mobile signal coverage for the regional network of the office building and the shopping mall. However, for base stations that has a Time Division Duplexing (TDD) format of a communication system such as a Worldwide Interoperability for Microwave Access (WIMAX), Code Division Multiple Access (CDMA), Time Division Synchronous Code Division Multiple Access (TD-SCDMA), and Long Term Evolution (LTE), time synchronization needs to be implemented among the base stations. If it is out of time synchronization, the quality of service provided to a user is greatly affected.

In the prior art, a clock synchronization apparatus of a satellite positioning system (such as a global positioning system, a Beidou Satellite System or a Galileo system) is installed in a base station so as to implement the synchronization by using the satellite positioning system. However, the layout of a GPS feed system is limited by many conditions. For the small-sized base stations used in the region such as the home environment, the workplace, or the shopping mall, it is difficult to install a clock apparatus of the satellite positioning system for each of the base stations, and meanwhile the system networking cost is greatly increased.

SUMMARY OF THE DISCLOSURE

Embodiments of the present disclosure provide a method and a communication system for implementing time synchronization.

The technical solutions of the embodiments of the present disclosure are implemented in the modes as follows.

In one aspect, the present disclosure provides a communication system, which includes: at least one base station, an optical line terminal (OLT), and a fiber for transmitting information between the base station and the OLT. The system further includes a clock synchronization server, which is configured to transmit synchronization data between the clock synchronization server and the at least one base station, so that time synchronization is implemented between the at least one base station and the clock synchronization server.

In another aspect, the present disclosure further provides a method for time synchronization in a communication system. The system includes an optical line terminal OLT, a clock synchronization server, at least one base station, and a fiber for transmitting information between the base station and the OLT. Synchronization data transmission is performed between the clock synchronization server and the at least one base station, so that time synchronization is implemented between the at least one base station and the clock synchronization server.

In the system and method provided in the embodiments of the present disclosure, synchronization data transmission is performed between the base station and the clock synchronization server, so that time synchronization is implemented between the base station and the clock synchronization server, which is easily implemented and has a low cost.

DETAILED DESCRIPTION OF ILLUSTRATIVE EMBODIMENTS

Embodiments of the present disclosure are described in detail with reference to the accompanying drawings in the following. In the following description, for describing rather than limiting the present disclosure, some specific details such as specific embodiments, operation processes and technologies are put forward to facilitate a full understanding of the present disclosure. For persons skilled in the art, the present disclosure may obviously be implemented through other embodiments that are not limited to the specific details. For example, although a small-sized base station is taken as an example in the present disclosure for description, such as a home Node B home Node B, a Micro base station, a Pico cell (PICO) base station and a Femto cell (Femto) base station.

Persons skilled in the art may understand that the present disclosure may also be applicable to base stations of other types, or a mixed networking mode of the small-sized base station and other types of base stations. Still for example, the present disclosure is mainly described based on a communication system that has a Time Division Duplexing TDD format, but persons skilled in the art may understand that the present disclosure is also applicable to other communication systems in which time synchronization needs to be implemented among base stations.

In some embodiments, a well-known method, interface and apparatus signaling technology are not described in detail, so as to prevent the present disclosure from becoming unclear due to unnecessary details. In addition, each single functional module is shown in some certain accompanying drawings. Persons skilled in the art may understand that these functions may be implemented by using the following modes: a single hardware circuit, a digital micro-processor executing a proper program, or software operated by a general computer, an application-specific integrated circuit (ASIC) and/or one or multiple digital signal processors (DSP). The link or connection in the embodiments of the present disclosure is not limited to physical connection, but includes a logical link.

Figure 1:
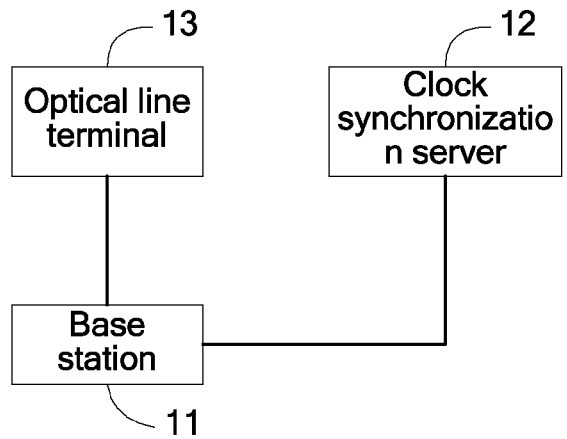
FIG. 1 is a schematic structure diagram of a communication system according to a first embodiment of the present disclosure.

A method and a communication system for time synchronization provided in the embodiments of the present disclosure are shown in FIG. 1, which includes at least one base station 11. For clearness, only one base station is shown in FIG. 1. The base station 11 may be a small-sized base station that is used to cover indoor space, such as a home Node B, a Femto base station, or a MICRO base station and a PICO base station that cover an office building; and may also be the base stations of other types. The communication system further includes an optical line terminal (OLT) 13. The OLT 13 is set between the base station and a network side to implement data transmission between the base station and the network side. The data transmission is performed between the OLT and the base station though a fiber.

The communication system further includes a clock synchronization server 12, configured to transmit synchronization data between the clock synchronization server and the base station, so that time synchronization is implemented between the base station and the clock synchronization server.

It should be noted that, how the OLT 13 implements data transmission between the OLT 13 and the network side is known to persons skilled in the art. The network side may be a core network and an IP (Internet Protocol) network. For example, the OLT may get access to the network side through a fiber to the building (FTTB) mode or through other access modes, which are not described in detail here. How the base station performs corresponding configuration processing after obtaining the synchronization data is also known to persons skilled in the art, which is not described in detail here. For example, the base station outputs, according to the synchronization data, synchronization response data and then transmits the data to the clock synchronization server, so as to implement synchronous communication with the clock synchronization server.

The system provided in the embodiment of the present disclosure transmits synchronization data between the base station and the clock synchronization server, so that time synchronization is implemented between the base station and the clock synchronization server, which is easily implemented. In particular, when a base station is used in indoor coverage, the base station and the network side do not need to support a synchronization protocol end to end.

As an example, the synchronization data between the clock synchronization server and the base station may be transmitted through a solely set fiber or cable. The synchronization data between the clock synchronization server and the base station may also be transmitted through an existing fiber between the OLT and the base station. For example, an existing fiber for transmitting service data between the OLT and the base station is used to transmit the synchronization data, so as to implement the sharing of the fiber, and save the networking cost.

As an example, the clock synchronization server may include a satellite receiving module, which may receive a synchronization reference signal of a satellite system, so as to implement a time alignment. The base station implements the time synchronization with the satellite system through the time synchronization with the clock synchronization server, thereby improving the time synchronization precision. The satellite system includes a GPS system, a Beidou satellite system, a Galileo system, or a global navigation satellite system (GLONASS).

Figure 2:
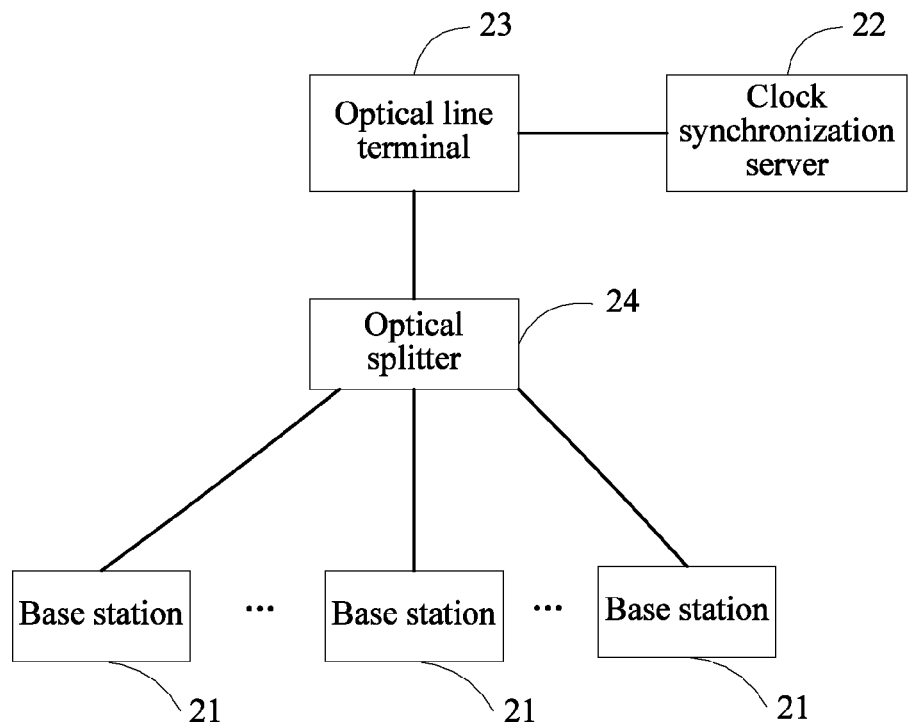
FIG. 2 is a schematic structure diagram of a communication system according to a second embodiment of the present disclosure.

A method and a system for implementing time synchronization provided in another embodiment of the present disclosure are shown in FIG. 2. The communication system includes one or more base stations 21 (for example, FIG. 2 shows three base stations), a clock synchronization server 22, an optical line terminal (OLT) 23, and a fiber for transmitting information between the optical line terminal 22 and the base station 21.

The base station 21 may be a small-sized base station that is used to cover indoor space, such as a home Node B, a Femto base station, or a small base station that cover an office building, such as a Micro base station and a PICO base station; and may also be base stations of other types. The effect and function of the base station are understood by persons skilled in the art, which are not described in detail here.

The clock synchronization server 22 is configured to transmit synchronization data between the clock synchronization server and the one or multiple base stations 21 through the fiber.

The optical line terminal OLT 23 is located between the network side and the base station 21, and configured to provide an interface between the network side and an access base station for a fiber access network. The OLT 23 is configured to receive service data of the network side and the synchronization data of the clock synchronization server 22, and transmit the service data and the synchronization data to the base station 21 through the fiber. On a contrary channel, the base station 21 outputs service data and synchronization data and transmits the data to the OLT 23 through the fiber. The OLT 23 respectively transmits the service data and the synchronization data to the network side and the clock synchronization server 22. For example, after receiving synchronization data of the clock synchronization server, the base station 21 performs corresponding configuration processing, and outputs synchronization response data and transmits the data to the clock synchronization server through the OLT 23, so that time synchronization between the base station and the clock synchronization server is maintained. One same fiber may be used on both the uplink and downlink channels; and different fibers may also be used on different channels.

The OLT transmits synchronization data with the clock synchronization server through an Ethernet interface, such as an FE (Fast Ethernet) interface.

In the embodiment provided by the present disclosure, time synchronization is implemented by setting a clock synchronization server apparatus; and the network structure is simple. In particular, when a base station is used in indoor coverage, the time synchronization may be implemented without installing a satellite positioning system near the base station; and thereby the cost is low. The base station may perform configuration processing through synchronization data transmission between the base station and the clock synchronization server, so that the time synchronization is implemented between the base station and the clock synchronization server. When multiple base stations exist, the multiple base stations are all capable of maintaining time synchronization with the clock synchronization server, so that time synchronization among the multiple base stations may also be implemented. Therefore, the time synchronization among multiple base stations can be implemented without supporting the synchronous protocol by the network side. Therefore, the selection for a network is more flexible and the networking cost is reduced.

As an example, the synchronization data between the clock synchronization server and the base station may be transmitted by using an original fiber. For example, a fiber for transmitting service data between the network side and the base station is used to transmit the synchronization data, that is, the synchronization data and the service data are transmitted through the same fiber, thereby implementing the sharing of the fiber. It is unnecessary to solely configure a synchronization transmission line, and therefore the networking cost is reduced.

It should be noted that, the same fiber described in the embodiments of the present disclosure indicates that the synchronization data and the service data are transmitted by using the same fiber channel, but is not limited to a fiber channel formed by one fiber, which may also be a fiber channel formed by multiple fibers.

As an example, the synchronization data between the clock synchronization server and the base station may also be transmitted through a solely set fiber or cable for connection, so that the network architecture is flexibly configured.

As an example, the communication system may further include an optical splitter 24 set between the OLT 23 and the base station 21 and configured to perform optical splitting processing on data received from the OLT and then transmit the data to the multiple base stations 21 on a channel of one direction, and couple signals of the multiple base stations and transmit the coupled signal to the OLT 23 through the fiber on a channel of another direction.

As an example, an optical network unit (not shown in the drawing) is set on the base station side. The effect and principle of the optical network unit is understood by persons skilled in the art, which are not described in detail here.

In the embodiment provided by the present disclosure, time synchronization among base stations, in particular among micro base stations, is implemented by setting a clock synchronization server. The cost is low; the size is small; and the installation is easy. The clock synchronization server may be connected to a satellite system to acquire a synchronization signal; and therefore the time alignment is more precise. The existing fiber may be used to perform synchronous transmission, which implements the sharing of the fiber, and reduces the networking cost. The backup function of synchronization data may also be implemented by setting multiple clock synchronization servers.

Figure 3:
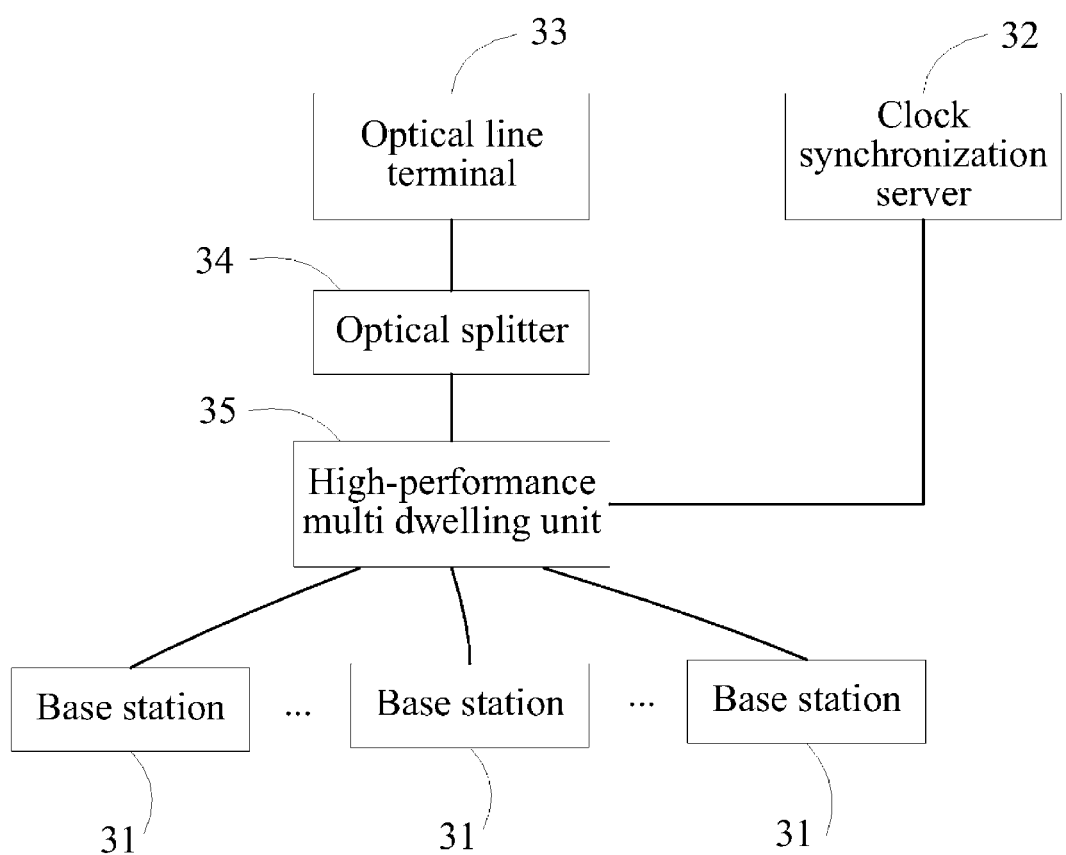
FIG. 3 is a schematic structure diagram of a communication system according to a third embodiment of the present disclosure.

A method and a system for implementing time synchronization provided in still another embodiment of the present disclosure are shown in FIG. 3. The system includes one or multiple base stations 31 (for example, FIG. 3 shows three base stations), a clock synchronization server 32, an optical line terminal OLT 33, an optical splitter 34, and a high-performance multi dwelling unit (MDU) 35.

The base station 31 may be a small-sized base station that is used to cover indoor space, such as a home Node B, a Femto base station, or a small base station that cover an office building, such as a Micro base station and a PICO base station; and may also be base stations of other types. The effect and function of the base station can be understood by persons skilled in the art, which are not described in detail here.

The base stations 31 may be connected to the MDU through a fiber or a cable, and may specifically be connected to the MDU 35 through an access mode of an Ethernet interface, such as a Fast Ethernet interface (FE), an XDSL, and FTTH. Specifically, how the base station gets access to the MDU through access modes such as the FE interface, FTTH, or XDSL is understood by persons skilled in the art, which is not described in detail here.

The MDU 35 is connected to the optical splitter 34 through a fiber, and transmits information, such as service data, with the optical splitter 34 through the fiber. The optical splitter 34 transmits information, such as service data, with the OLT through a fiber.

The clock synchronization server 32 gets access to the MDU 35 through an Ethernet interface, and synchronization data transmission is performed between the clock synchronization server 32 and the base stations 31 through the MDU 35, so that time synchronization between each of the base stations and the clock synchronization server is maintained. The Ethernet interface may be an FE interface, and may also be the other interfaces for access.

In the embodiment provided by the present disclosure, the synchronization data transmission is implemented between each base station and the clock synchronization server by setting the clock synchronization server for accessing the MDU, so that the time synchronization between each of the base stations and the clock synchronization server is maintained. The network structure is simple; the cost is low; and the time synchronization can be implemented among multiple base stations, particularly used in indoor coverage, without installing a satellite positioning system near the base stations. The time synchronization among the base stations can be implemented without supporting a synchronization protocol by the network side. When multiple base stations exist, the multiple base stations are all capable of maintaining time synchronization with the clock synchronization server, so the time synchronization can also be implemented among multiple base stations.

As an example, the OLT (13; 23; and 33) in the above embodiments may get access to a core network through a broadband access network, such as through a fiber to the building (FTTB); and may also get access through other access modes. Still for example, the OLT may be connected to an IP (Internet Protocol) network. How the OLT (13; 23; and 33) is connected to the network side is understood by persons skilled in the art, which may adopt all the modes in the prior art, and the details are not described here.

As an example, the OLT (13; 23; and 33) may transmit service data with the network side through an Ethernet interface, such as a GE interface.

As an example, the clock synchronization server (12; 22; and 32) includes a satellite receiving module which may receive a synchronization reference signal of a satellite system, so as to implement time alignment, and further implement time synchronization of the base station system and increase the precision of the time synchronization. The satellite system includes a GPS system, a Beidou satellite system, a Galileo system, or a Global Navigation Satellite System (GLONASS).

As an example, the clock synchronization server (12; 22; and 32) may be a server that adopts IEEE 1588 Protocol, or a server that adopts other synchronization protocols, or other clock synchronization servers.

As an example, the clock synchronization server (12; 22; and 32) may be a server that adopts IEEE 1588V2 Protocol. The server that adopts the IEEE 1588V2 Protocol includes a satellite receiving module, which may receive a synchronization reference signal of a satellite system. The server that adopts the IEEE 1588V2 Protocol may further include an IEEE 1588V2 Protocol processing and communication circuit, configured to perform synchronization processing on the synchronization reference signal received from the satellite system, and output synchronization data through an Ethernet interface.

As an example, one or multiple clock synchronization servers (12; 22; and 32) may exist. For example, it may be that all base stations in a certain region share one clock synchronization server, so that the system apparatus is simple and the cost is low; or, it may also be that several base stations share one or multiple clock synchronization servers, so that multiple clock synchronization servers may exist in a certain region, so as to implement the backup function of synchronization data.

Persons of ordinary skills in the art should understand that all or a part of the steps of the method according to the embodiments may be implemented by a program instructing relevant hardware. The program may be stored in a computer readable storage medium. When the program is run, the steps of the method according to the embodiments of the present disclosure are performed. The storage medium may be a magnetic disk, an optical disk, a read-only memory (ROM), or a random-access memory (RAM).

The objectives, the technical solutions, and the beneficial effects of the present disclosure have been described in further detail through the above specific embodiments. It should be understood that the above descriptions are merely specific embodiments of the present disclosure, but are not intended to limit the protection scope of the present disclosure. Any modification, equivalent replacement, or improvement made by persons skilled in the art without creative efforts should fall within the protection scope of the present disclosure.

What is claimed is:

1. A communication system, comprising:
    a plurality of base stations;
    an optical line terminal (OLT);
    a fiber for transmitting information between the plurality of base stations and the OLT; and
    a clock synchronization server coupled to the OLT;
    wherein the clock synchronization server is configured to receive a synchronization reference signal of a satellite system, create common synchronization data according to the synchronization reference signal, and transmit the common synchronization data to the OLT;
    wherein the OLT is configured to relay the common synchronization data to each of the plurality of base stations;
    wherein the each of the plurality of base stations is configured to transmit synchronization response data to the OLT in response to the common synchronization data;
    wherein the OLT is further configured to relay the synchronization response data to the clock synchronization server; and
    wherein the clock synchronization server and the each of the plurality of base stations synchronize clocks according to an IEEE 1588V2 protocol, so that the OLT does not perform clock synchronization with the each of the plurality of base stations.

2. The system according to claim 1, wherein service data between the OLT and the plurality of base stations, the common synchronization data, and the synchronization response data between the clock synchronization server and the plurality of base stations, share the fiber.

3. The system according to claim 2, wherein the system further comprises an optical splitter located between the OLT and the plurality of base stations.

4. The system according to claim 1, wherein the system comprises a plurality of clock synchronization servers in a certain region.

5. The system according to claim 1, wherein each of the plurality of base stations is a small-sized base station.

6. The system according to claim 1, wherein each of the plurality of base stations comprises a home Node B, a Micro base station, a Pico cell base station, or a Femto cell base station.

7. A method for time synchronization in a mobile communication system, the system comprising a plurality of base stations, an optical line terminal (OLT), a fiber for transmitting information between the plurality of base stations and the OLT, and a clock synchronization server coupled to the OLT, wherein the method comprises:
    receiving, by the clock synchronization server, a synchronization reference signal of a satellite system;
    creating, by the clock synchronization server, common synchronization data according to the synchronization reference signal;
    transmitting, by the clock synchronization server, the common synchronization data to the OLT;
    relaying, by the OLT, the common synchronization data to each of the plurality of base stations;
    transmitting, by the each of the plurality of base station, synchronization response data to the OLT in response to the common synchronization data; and
    relaying, by the OLT, the synchronization response data to the clock synchronization server;
    wherein the clock synchronization server and the each of the plurality of base stations synchronize clocks according to IEEE 1588V2 protocol, so that the OLT does not perform clock synchronization with the each of the plurality of base stations.

8. The method according to claim 7, wherein service data between the OLT and the plurality of base stations, the common synchronization data, and the synchronization response data between the clock synchronization server and the plurality of base stations, share the fiber.

9. The method according to claim 7, wherein each of the plurality of base stations is a small-sized base station.

10. The method according to claim 9, wherein each of the plurality of base stations comprises a home Node B, a Micro base station, a Pico cell base station, or a Femto cell base station.

11. The method according to claim 7, wherein the system further comprises an optical splitter located between the OLT and the plurality of base stations.

12. The method according to claim 7, wherein the system further comprises a plurality of clock synchronization servers in a certain region.

\* \* \* \* \*